United States Patent

Hirs

[15] 3,656,819

[45] Apr. 18, 1972

[54] AEROSTATIC OR HYDROSTATIC BEARING

[72] Inventor: Gilles Gerardus Hirs, Pijnacker, Netherlands

[73] Assignee: Nederlandse Organisatie Voor Toegepast-Natuurwetenschappelijk Onderzoek Ten Behoeve Van Nijverheid, Handel En Verkeer, The Hague, Netherlands

[22] Filed: Aug. 21, 1970

[21] Appl. No.: 65,990

[30] Foreign Application Priority Data

Aug. 29, 1969 Netherlands..........................6913284

[52] U.S. Cl. ............................................................308/9
[51] Int. Cl. ......................................................F16c 17/16
[58] Field of Search..............................................308/9, 122

[56] References Cited

UNITED STATES PATENTS 2,976,087   3/1961   Cherubim............................308/122

Primary Examiner—Martin P. Schwadron
Assistant Examiner—Frank Susko
Attorney—Hammond & Littell

[57] ABSTRACT

In an aerostatic or hydrostatic bearing a ring that is freely movable in the lubricant supply flow controls the lubricant distribution over the entry of the slit between the bearing members and amplifies the circumferential pressure differentiation occurring at eccentric positions of the bearing members. As a result the bearing's carrying capacity and stiffness are improved.

7 Claims, 5 Drawing Figures

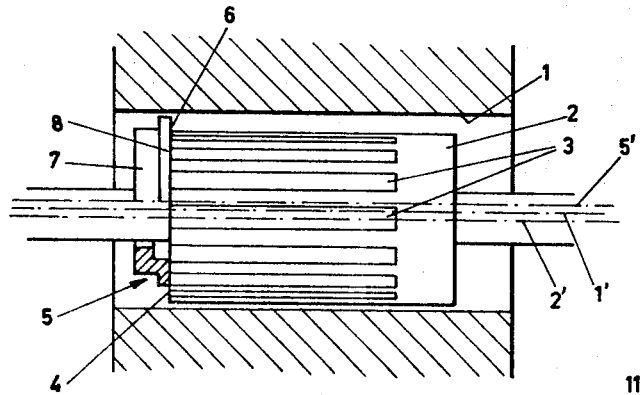
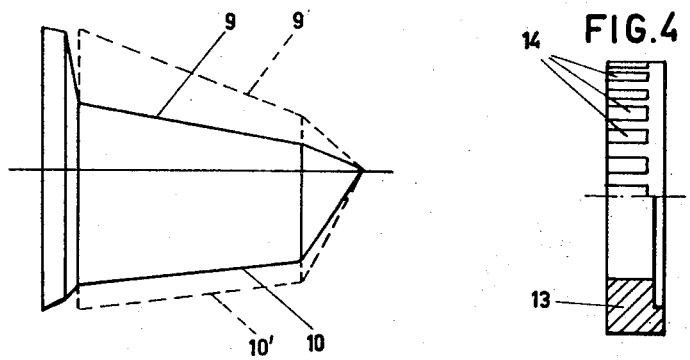
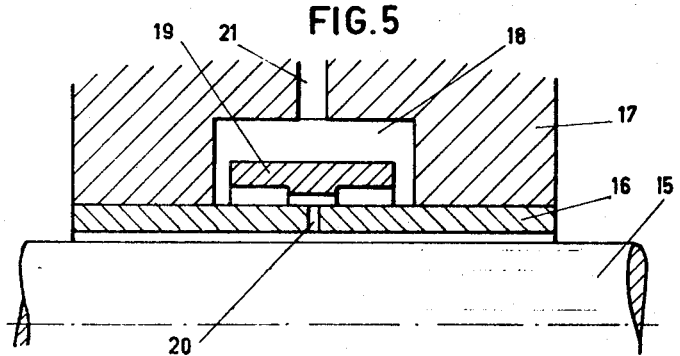

AEROSTATIC OR HYDROSTATIC BEARING

The invention relates to an aerostatic or hydrostatic bearing consisting of two substantially uniform surfaces separated by a slit and means to feed through this bearing-slit a flow of lubricant distributed over the breadth of the slit.

With bearings of this type known in the art, in the first section of the bearing-slit, which section immediately is connected to the lubricant supply means, the flow of lubricant meets with less resistance than in the remaining part of the slit, as a result of a larger slit-width or the presence of grooves in one of the bearing surfaces. The result of this is that at a decrease of the slit-width under the influence of the bearing-load the flow resistance of the first slit-section increases less than that of the second slit-section and that, the supply pressure and discharge pressure of the lubricant remaining the same, the average pressure in the slit increases. Analogously the average lubricant pressure decreases when the slit-width increases. The aerostatic and hydrostatic bearings derive their carrying capacity and rigidity from this phenomenon.

It is the object of the invention to provide an aerostatic or hydrostatic bearing of which, at the same supply pressure of the lubricant, the carrying capacity and the rigidity are greater than of the said bearings known in the art.

For this purpose the bearing according to the invention is characterized by a slit-shaped space incorporated in the lubricant supply, and distributing the latter over the breadth of the bearing-slit, one wall of the said space forming part of an element movable in relation to the other wall in dependence of the lubricant flow, which element, by its position, controls the distribution of the lubricant flow across the breadth of the bearing-slit.

When with this bearing the width of the bearing-slit for instance increases on a certain location under the influence of a change in the bearing load, the ratio there between the flow resistance of the slit-shaped distribution space and that of the bearing-slit changes such, that on the said location the movable element meets with less lubricant pressure and moves in the direction of the opposite wall. The raised flow resistance there results in a locally lower lubricant pressure at the entry of the bearing-slit. Similarly, the lubricant pressure at the entry of the bearing-slit is raised in proportion as the bearing-slit narrows.

The carrying capacity and the rigidity of the bearing, which are obtained in this way, are considerably greater than those of bearings known in the art, the entry pressure and the exit pressure being constant and the changes in the average lubricant pressure being exclusively the result of changes in the pressure drop between the entry and the exit of the bearing-slit.

In the bearing according to the invention the bearing-slit may, like in the bearings known in the art, consist of two sections with different flow resistances; such a provision supports the operation of the movable element, but is not essential for it.

For an adequate performance of the bearing according to the invention it is of importance that the position the movable element occupies after a change of the bearing-load is a stable equilibrium. Though this can be realized by attaching the movable element with the aid of springs, for instance, the bearing according to the invention, however, is preferably further characterized in that the slit-shaped space narrows in the direction of the flow and in that the element adjoining this space can move freely in the lubricant flow transversely to the direction of flow. Then the movable element itself forms an aerostatic or hydrostatic bearing of the type known in the art and constantly occupies a position that depends on the bearing-slit width, but for the rest is stable.

The slit-shaped space with the movable element can, depending on the circumstances, be constructed as a unit that to a certain extent stands on its own or as a more integrating part of the bearing. In the latter case an efficient construction is obtained when the slit-shaped distribution space and the bearing slit immediately blend with each other and a part of one of the bearing surfaces also serves as the fixed wall of the distribution space.

The invention will be further elucidated below with reference to a drawing; in this:

FIG. 1 shows: an example of a radial bearing according to the invention;

FIG. 2 : a pressure diagram related to the bearing of FIG. 1;

FIGS. 3 and 4: alternative embodiments of ring 5 in FIG. 1.

FIG. 5 : another example of a radial bearing according to the invention.

The bearing according to FIG. 1 consists of a cylindrical bore 1 and a shaft section 2, which, with some clearance, fits in bore 1. This clearance, which in the drawing is shown strongly enlarged for clearness' sake, in reality is as large as in comparable bearings known in the art. Shaft section 2 is provided with axially directed grooves, which are evenly distributed over the periphery and which stretch from end plate 4 of bearing section 2 and whose depth is not greater than a few times the clearance with which shaft section 2 fits in bore 1.

A ring 5 with its plane side 6 rests against end plane 4 of shaft section 2 and fits in bore 1 with approximately the same clearance as shaft section 2, the clearance of annular section 7, however, being somewhat greater than that of annular section 8.

A pressurized lubricant that, depending on a great number of circumstances may be either a liquid or a gas, is fed to the bearing via the space on the left-hand side of ring 5, which space for this purpose is provided with a suitable seal or is situated between two bearings that are each other's reflected images.

As a result of the supply pressure the lubricant flows through the slit that is situated between bore 1 on the one hand and ring 5 and shaft section 2 on the other hand, to the space on the right-hand side of shaft section 2 and a pressure distribution diminishing from left to right is produced.

When shaft 2 and ring 5 are coaxial with bore 1, the pressure distribution on all sides of shaft 2 and ring 5 is the same and there is no resulting force on shaft 2.

Under the influence of, for instance, an external load that is directed downwards, shaft 2 moves to an excentric position that is situated lower in relation to bore 1, such as FIG. 1 shows.

Because of the greater slit-width at the upper side of shaft 2, a smaller flow resistance obtains in situ, so that in the slit over ring 5 the pressure gradient increases and the average pressure decreases. Similarly, the average pressure in the slit under ring 5 is higher. The force resulting from this moves ring 5 to a higher situated excentric position in relation to bore 1.

The pressure gradient in the slit strongly increases over annular section 8 and decreases over annular section 7 and shaft 2, whereas in the slit at the lower section of ring 5 and shaft 2 the reverse takes place, until ring 5 has reached a position at which the average pressure at the upper side and that at the lower side are equal to each other and ring 5 is in equilibrium again.

In this excentric position ring 5 at its upper end offers more resistance to the lubricant flow that at its lower side, so that the lubricant enters the bearing slit at the upper side under a lower pressure than at the lower side.

Moreover, on the location of the ungrooved section of shaft 2 the decrease of the resistance at the upper side and the increase at the lower side both caused by the excentric position of shaft 2 are stronger than on the location of that section of shaft 2 across which grooves 3 run.

The final result is a pressure pattern of which FIG. 2 shows a diagram; curve 9 represents the pressure in the slit over and curve 10 the pressure in the slit under ring 5 and shaft 2.

It is found that the pressure under shaft 2 is greater than the pressure over it, so that an upward force works upon shaft 2, which force is directed against the external load and against the excentricity of shaft 2. Under the influence of this, shaft 2 will occupy such a position in bore 1 that the lubricant pressure and the external load balance.

In the pressure diagram of FIG. 2 lines 9' and 10' represent the pressure pattern that would be obtained in the absence of ring 5 and the same excentricity of shaft 2. It is clear that in this case the difference between the average pressure under and that over the shaft is considerably smaller, which means that without ring 5 the bearing has a smaller carrying capacity and a smaller rigidity.

FIG. 3 shows a variant of ring 5 in the bearing of FIG. 1. Instead of comprising two section 7 and 8, which with different clearances fit in bore 1, this ring 11 is slightly conical on its periphery 12; its operation, however, in principle, is the same as that of ring 5 in FIG. 1.

Ring 13 according to FIG. 4 is likewise a variant of ring 5 in FIG. 1. In this instance the greater clearance, with which section 7 of ring 5 fits in bore 1, has been replaced by grooves 14, which run across a part of the periphery.

It is remarked that there where ring 5 with its side plane 6 rests against side plane 4 of the shaft, there should be no circular channel, for instance, as a result of rounded or bevelled corners, because such a channel would short-circuit and level the differences in pressure at the entry of the bearing-slit and would cause the effect of ring 5 to be lost.

With the bearing according to FIG. 5 shaft 15, with some clearance, fits in sleeve 16, which is mounted in a frame or other machine part 17. At the outer side of sleeve 16 space 18 has been provided and in it there is ring 19, which fits around sleeve 16 with a clearance that is somewhat smaller in the centre than at the edges. In sleeve 16, distributed over the periphery, a number of holes 20 is provided, which connect space 18 via the slit between ring 19 and sleeve 16 with the bearing-slit between shaft 15 and sleeve 16. Through one or more channels 21 space 18 communicates with a system for the supply of a lubricant under pressure.

The operation of this bearing is substantially the same as that of the bearing according to FIG. 1. At an excentric position of shaft 15 in sleeve 16 ring 19 is forced in an excentric position by the unevenness in the flow of lubricant on the location of the reduced bearing-slit and that on the location of the enlarged bearing-slit, the slit between ring 19 and sleeve 16 being the narrowest where the bearing-slit is the widest, and vice versa. The result is such a differentiation in the pressure with which the lubricant comes into the bearing-slit that a force results directed against the excentricity of shaft 15.

Shaft 15 does not have a partially grooved surface such as shaft 2 in FIG. 1; such grooves are not essential for the operation of these bearings; they do raise the carrying capacity and the rigidity, however, and if this advantage outweighs the costs, shaft 15 in the bearing in FIG. 5 may also be provided with grooves.

Besides in the radial bearings as described, such elements like rings 5, 11, 13 and 15, which control and differentiate the supply pressure of the lubricant, can also be applied in thrust bearings and guiding devices for linear movements, such as pistons and plungers in pumps and slides of machine tools, in order to increase the carrying capacity and the rigidity and to avoid grooved surfaces, if desired.

I claim:

1. An aerostatic or hydrostatic bearing consisting of two substantially uniform surfaces, separated by a slit and means to supply through this bearing-slit a flow of lubricant divided over the breadth of the slit, comprising a slit-shaped space incorporated in the lubricant supply and distributing the lubricant over the breadth of the bearing-slit, one wall of the said space forming part of an element, movable in relation to the other wall in dependence of the lubricant flow, the said element by its position controlling the distribution of the lubricant flow over the breadth of the bearing-slit, said slit-shaped space narrows in the direction of the flow, and said element adjoining this space is freely movable with respect to the slit and the outer surface in the lubricant flow transversely to the direction of flow.

2. A bearing according to claim 1, wherein a number of channels each connect an exit place of the slit-shaped distribution space to an entry place of the bearing-slit.

3. A bearing according to claim 2, consisting of a sleeve and a shaft with some clearance fitting in it, wherein the movable element is a ring with some clearance fitting around the sleeve and wherein on the location of the ring the sleeve is provided with a number of holes distributed over the periphery.

4. A bearing according to claim 1, wherein the slit-shaped distribution space and the bearing-slit blend directly.

5. A bearing according to claim 4, wherein one of the bearing planes at the same time forms the immovable wall of the slit-shaped distribution space.

6. A bearing according to claim 5, consisting of a bore and a shaft with some clearance fitting in it, wherein the movable element is a ring that also with some clearance fits in the bore and that with one plane side is movable along a radial plane of the shaft.

7. A bearing according to claim 5, consisting of a bore and shaft that with some clearance fits in it, wherein the movable element is a ring that with some clearance fits around the shaft and that with one plane side is movable along a radial plane that joins the bore.

* * * * *